United States Patent
Kippe et al.

(12) 
(10) Patent No.: US 6,901,964 B2
(45) Date of Patent: Jun. 7, 2005

(54) VEHICLE FUEL PULSE DAMPER

(75) Inventors: Bradley N. Kippe, Holly, MI (US); Barry L. Thater, Union, MO (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/823,925

(22) Filed: Mar. 30, 2001

(65) Prior Publication Data

US 2002/0139426 A1 Oct. 3, 2002

(51) Int. Cl.⁷ .............................................. F16L 55/04
(52) U.S. Cl. ........................ 138/30; 138/26; 123/467; 137/510
(58) Field of Search ............................ 138/30, 31, 26; 123/467; 137/510

(56) References Cited

U.S. PATENT DOCUMENTS

| | | | |
|---|---|---|---|
| 1,892,685 A | 1/1933 | Pirsch ..................... 138/30 X |
| 3,477,473 A | 11/1969 | Biabaud ..................... 138/30 |
| 3,938,486 A | * 2/1976 | Oglesby ..................... 123/444 |
| 4,064,854 A | * 12/1977 | Fehrenbach et al. ......... 123/452 |
| 4,092,017 A | 5/1978 | Urushiyama et al. ......... 267/65 |
| 4,186,776 A | 2/1980 | Burton ..................... 138/30 |
| 4,205,637 A | * 6/1980 | Ito et al. ..................... 123/447 |
| 4,373,872 A | * 2/1983 | Kemmner et al. ........... 417/312 |
| 4,556,087 A | 12/1985 | Casilli ..................... 138/30 |
| 4,615,320 A | 10/1986 | Fehrenbach et al. ........ 123/467 |
| 5,076,320 A | * 12/1991 | Robinson ................... 137/454.2 |
| 5,129,427 A | 7/1992 | White et al. ................... 138/30 |
| 5,152,269 A | * 10/1992 | Murphy ..................... 123/470 |
| 5,364,236 A | 11/1994 | Herron et al. ............... 417/312 |
| 5,374,169 A | 12/1994 | Talaski ..................... 417/540 |
| 5,413,468 A | 5/1995 | Tuckey ..................... 417/540 |
| 5,476,368 A | 12/1995 | Rabenau et al. ............. 417/395 |
| 5,490,765 A | 2/1996 | Bailey et al. ................... 417/2 |
| 5,516,266 A | 5/1996 | Talaski ..................... 417/540 |
| 5,562,429 A | 10/1996 | Romstad et al. ............. 417/540 |
| 5,579,739 A | * 12/1996 | Tuckey et al. ............... 123/467 |
| 5,609,138 A | * 3/1997 | Mutschler ..................... 123/463 |
| 5,711,553 A | 1/1998 | Bonser ..................... 285/319 |
| 5,771,936 A | 6/1998 | Sasaki et al. ................... 138/31 |
| 5,967,120 A | * 10/1999 | Blanton et al. ............. 123/467 |
| 5,980,221 A | 11/1999 | Uffelman ..................... 417/540 |
| 6,032,651 A | * 3/2000 | Field ..................... 123/467 |
| 6,135,092 A | * 10/2000 | Schaenzer et al. .......... 123/456 |
| 6,155,235 A | * 12/2000 | Kilgore ..................... 123/467 |
| 6,182,637 B1 | * 2/2001 | Kilgore et al. ............... 123/467 |
| 6,230,685 B1 | * 5/2001 | Kilgore et al. ............... 123/467 |

* cited by examiner

*Primary Examiner*—Patrick Brinson

(57) ABSTRACT

A fuel pressure pulse damper includes metallic damper body defining a chamber in which a flexible diaphragm is received in a manner to dampen fuel pressure pulses between a fuel pump and fuel injectors of a vehicle fuel system. The damper body includes a barbed fitting to receive fuel form the fuel pump and quick connect fitting for connection to a fuel rail for supplying pressurized fuel to fuel injectors of the vehicle engine.

10 Claims, 6 Drawing Sheets

VEHICLE FUEL PULSE DAMPER

FIELD OF THE INVENTION

The present invention relates to a fuel pressure pulse damper for a vehicle fuel system.

BACKGROUND OF THE INVENTION

Hydraulic pulse dampers are used on vehicles to eliminate or reduce hydraulic pulses caused by the fuel injector and the fuel pump. Typically, the damper is mounted in-line near the vehicle engine or in the fuel sender unit in the vehicle fuel tank. The fuel injector pulses have been found to generate problems with precise fuel delivery to the engine as engine fuel control systems have become more precise to meet federal emission regulations. This problem has necessitated the existing fuel pulse damper to be packaged nearer to the source of the noise (pressure pulses); i.e., nearer to the fuel rail on the engine. A widely used in-line pulse damper includes two barb-type fittings which allow it to be spliced into the fuel line.

An object of the present invention is to provide an improved fuel pressure pulse damper including a quick connect fitting for connection to the fuel supply rail and constructed in a manner to improve damper durability in service.

SUMMARY OF THE INVENTION

The present invention provides a fuel pressure pulse damper having a metallic damper body defining a chamber in which a flexible diaphragm is positioned in a manner to attentuate fuel pressure pulses between a fuel supply rail and fuel injectors of a vehicle fuel system. The damper body includes a first fitting for connection to a fuel line receiving pressurized fuel from a fuel pump and a quick connect fitting for supplying the pressurized fuel to fuel injectors of the vehicle engine.

In one embodiment of the invention, the metallic damper body includes first and second metallic housings that mate together to define the chamber and to trap a peripheral edge of the flexible gas impermeable diaphragm such that the diaphragm divides the chamber into a first chamber that communicates to pressurized fuel entering the first fitting and leaving the quick connect fitting and a second gas-filled or air-filled chamber that allows the diaphragm to flex in a manner to attenuate or dampen fuel pressure pulses in the fuel system. The quick connect fitting can be formed integrally with the damper body or preformed as a separate component and fastened thereto metallurgically by brazing or welding. The first fitting also can be formed integrally with the damper body or preformed as a separate metal component and fastened thereto metallurgically by brazing or welding.

The above objects and advantages of the invention will become more readily apparent from the following description taken with the following drawings.

DETAILED DESCRIPTION OF THE INVENTION

Figure 2:
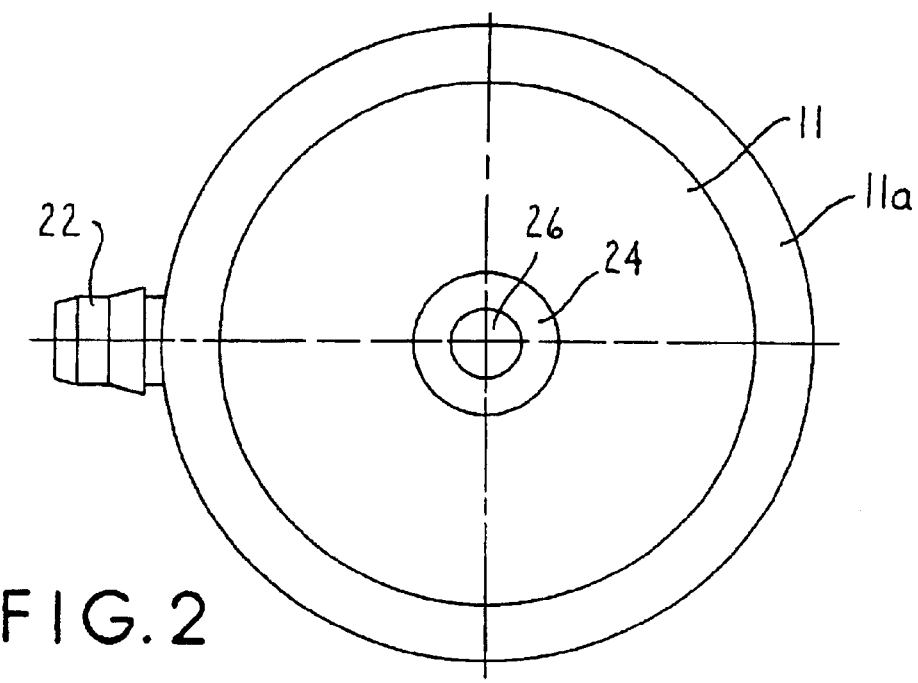
FIG. 2 is a plan view of the damper of FIG. 1.
Figure 1:
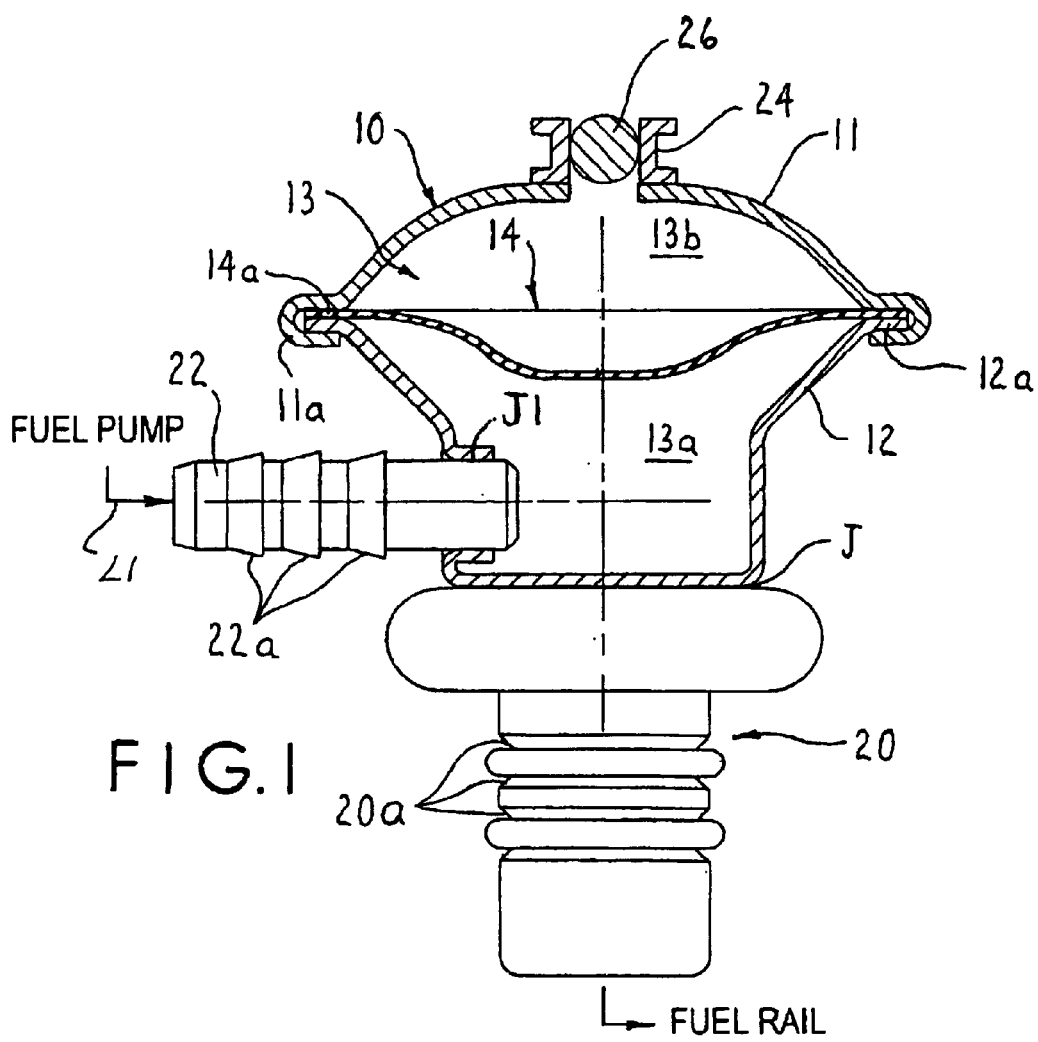
FIG. 1 is a sectional view of a fuel pressure pulse damper pursuant to an embodiment of the invention.

Referring to FIGS. 1–2, an embodiment of the invention is illustrated for purposes of illustration and not limitation. The fuel pressure pulse damper is shown comprising a damper body 10 that comprises first and second metallic housings 11, 12 that mate together to define a chamber 13 therein and to trap a peripheral edge 14a of a flexible gas-impermeable diaphragm 14 such that the diaphragm divides the chamber 13 into a first chamber 13a that communicates to pressurized fuel entering the first (barbed) fitting 22 and leaving the quick disconnect fitting 20 and a second gas-filled or air-filled chamber 13b that allows the diaphragm 14 to flex in a manner to attentuate (reduce) fuel pressure pulses exceeding a preselected value in the fuel system to dampen the fuel pressure pulses and smooth operation of the fuel delivery system. The chamber 13b can be filled with pressurized gas or ambient air. For example, the housings 11, 12 and diaphragm 14 can be assembled in pressurized superambient gas to trap the pressurized gas in the chamber 13b and sealed therein by joining the housings 11, 12 to form a gas tight peripheral seal as described below. Alternately, the chamber 13b can be filled with gas via a charge port 24 as described below.

The housings 11, 12 typically are formed of steel, aluminum and its alloys and magnesium and its alloys, and zinc and its alloys by screw machining, stamping, die casting or other technique to have the configurations shown. The upper housing 11 includes a peripheral edge 11a that is crimped over the flat lip 12a of the lower housing 12 as shown in FIG. 1 with the peripheral edge 14a of the diaphragm trapped therebetween to provide a gas tight seal.

The upper housing 11 may include an optional gas charge port 24 fastened metallurgically thereto by brazing or welding, or formed integrally therewith and through which pressurized gas can be introduced into chamber 13b. The port is closed off by a ball plug 26 after the chamber 13b is filled to an appropriate pressure with gas, which may be air, inert gas, nitrogen or other suitable gas. The plug 26 is brazed or pressed in the port 24 to provide a gas tight seal. Superambient pressure in chamber 13b typically is provided up to 30 psi gage pressure regardless of how chamber 13b is filled with gas. If ambient air at atmospheric pressure is desired in chamber 13b, the housings can be assembled in ambient air without the port 24 and plug 26.

The quick connect fitting 20 is shown as a separate preformed metallic (e.g. steel) component metallurgically fastened to the lower housing 12 by brazing or welding at joint J. The quick connect fitting 20 includes an internal passage that communicates to chamber 13a to supply fuel thereto. The quick connect fitting 20 typically comprises a conventional quick fitting available in several styles and sizes from ITT Industries, TI Group, Visteon, and other sources and including a series of axially spaced annular grooves 20a to be received in a conventional female quick connect fitting (not shown) available in several styles and sizes from the above referenced sources on the fuel rail (not shown). The invention is not limited to a male quick connect fitting on the damper body 10 and envisions a female quick connect fitting on the damper body 10 and a male quick connect fitting on the fuel rail. The invention also envisions forming the quick connect fitting of metal integrally with the damper body 10 by die casting or forging.

The barbed fitting 22 is shown as a separate preformed metallic (e.g. steel) component metallurgically fastened to the lower housing 12 by brazing or welding at joint J1. The barbed fitting 22 includes an internal passage that communicates to chamber 13a to allow fuel to enter from the fuel pump for flow to the engine fuel injectors. A male barbed fitting 22 is available as a conventional screw machine fitting and includes a series of axially spaced annular ribs 22a to be frictionally received in a conventional rubber or plastic fuel line or hose (not shown). The invention envisions forming the barbed fitting 22 of metal integrally with the damper body 10 by die casting or forging.

In operation, pressurized fuel enters the barbed fitting 22 from a fuel pump and fuel line L1, flows through chamber 13a of damper body 10, and exits through the quick connect fitting 20 to the fuel supply rail for supply to the fuel injectors of the vehicle engine. The flexible diaphragm 14 can flex by virtue of the gas-filled chamber 13b (pressurized gas or ambient air) on the side thereof opposite of fuel flow to attenuate fuel pressure pulses that exceed a preselected pressure in the fuel system to dampen the pressure pulses and smooth fuel pressure in the system.

The metal damper body 10 with quick connect fitting 20 thereon permits direct connection of the fuel pressure pulse damper to the fuel supply rail via a complementary quick connect fitting on the fuel supply rail and imparts improved durability to the pulse damper in service and reduces the cost and number of joints needed for the pulse damper.

Figure 3:
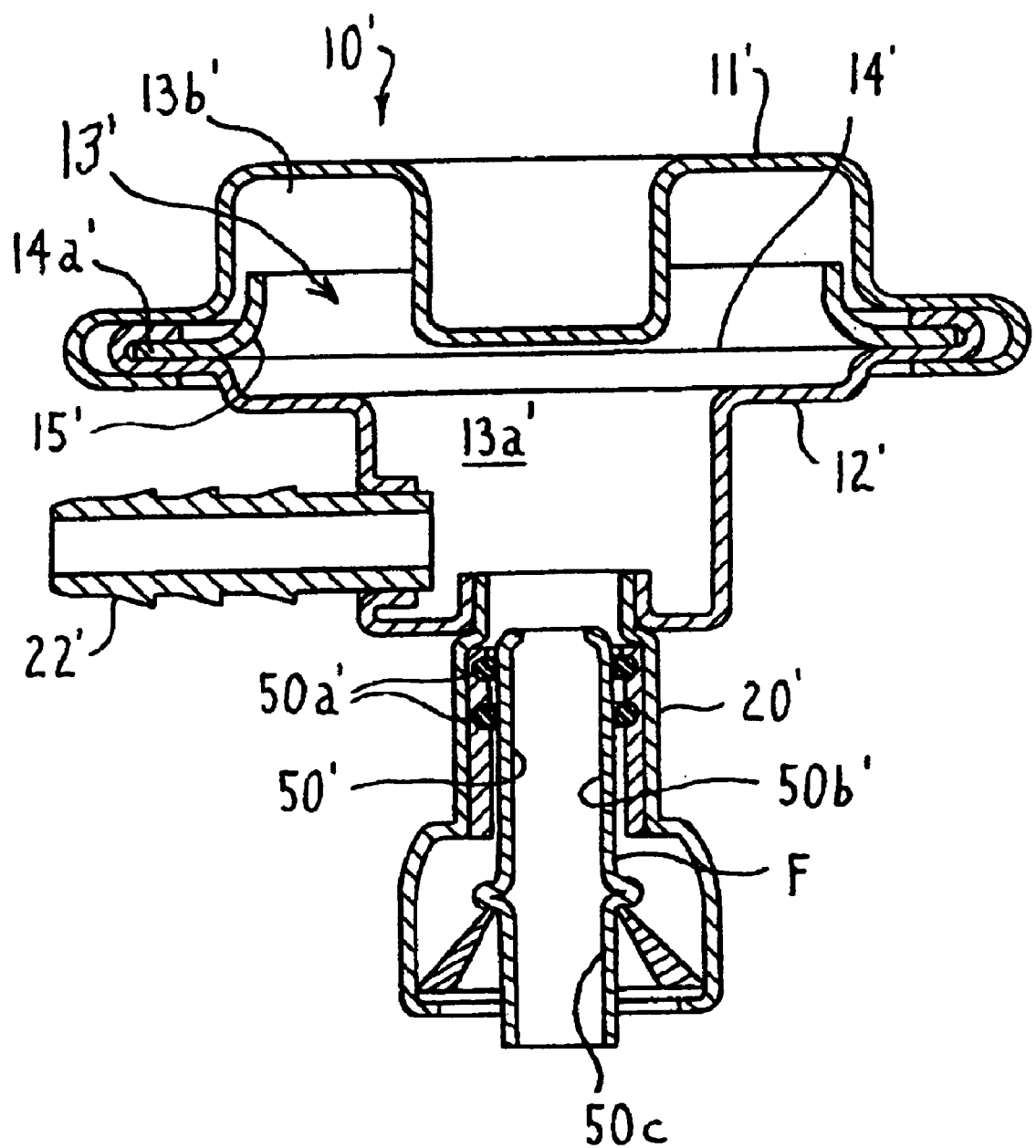
FIG. 3 is a sectional view of a fuel pressure pulse damper pursuant to another embodiment of the invention.

FIG. 3 illustrates another embodiment of the pulse damper of the invention where like features are represented by like reference numerals primed. The fuel pressure pulse damper is shown comprising a damper body 10' that comprises first and second metallic housings 11', 12' that mate together with a third metallic housing 15' to define a gas or air-filled chamber 13' therein. The first and second housings 11', 12' are crimped directly together while the second and third housings 12', 15' are crimped together to trap a peripheral edge 14a' of a flexible gas-impermeable diaphragm 14'. The third housing 15' is provided to allow in process leak testing of the crimp. The housings 11'. 12', 15' are formed of steel by screw machining, stamping, die casting and the like. The diaphragm 14' divides the chamber 13' into a first chamber 13a' that communicates to pressurized fuel entering the barbed fitting 22' and leaving the quick disconnect fitting 20' and a second gas-filled chamber 13b' that allows the diaphragm 14' to flex in a manner to reduce fuel pressure pulses exceeding a preselected value in the fuel system to dampen the fuel pressure pulses and smooth operation of the fuel delivery system. Quick connect fitting 20' receives a conventional stuffer pin assembly 50' for purpose of accepting, retaining and sealing a conventional male quick connect fitting tubular end form F. The stuffer pin assembly 50' comprises a pair of O-rings 50a', a tubular housing 50b' and locking mechanism 50c' for locking on the male quick connect end form F and is available from ITT Industries and TI Group.

Figure 4:
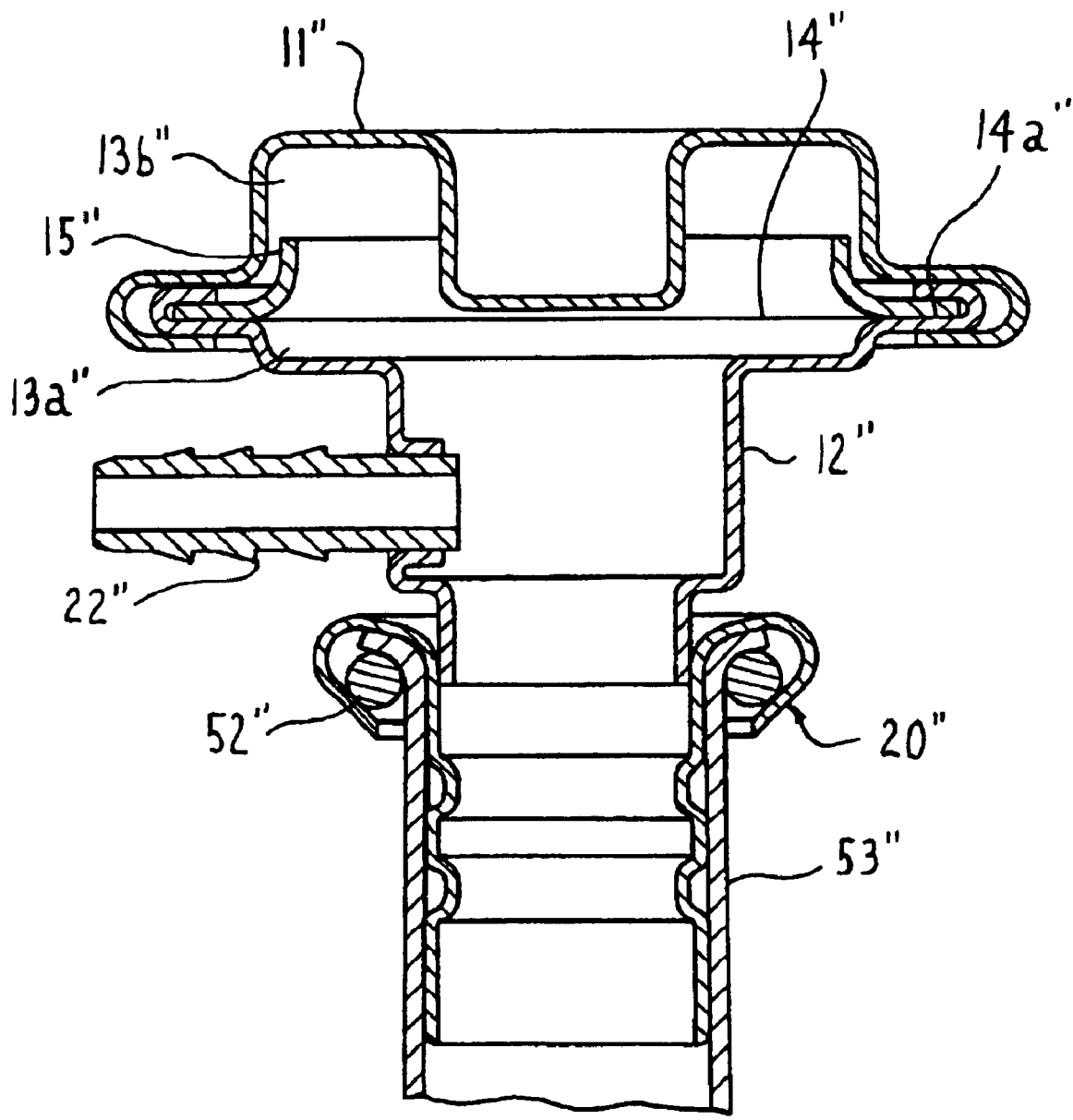
FIG. 4 is a sectional view of a fuel pressure pulse damper pursuant to still another embodiment of the invention.

FIG. 4 illustrates another embodiment of a pulse damper 10" of the invention where like features are represented by like reference numerals double primed and differing form the embodiment of FIG. 3 in having a quick connect fitting 20" that is held on housing 12" by annular garter spring 52" and received in a female quick connect fitting 53". The diaphragm 14" divides the chamber 13" into a first chamber 13a" that communicates to pressurized fuel entering the barbed fitting 22" and leaving the quick disconnect fitting 20" and a second gas or air-filled chamber 13b" that allows the diaphragm 14" to flex in a manner to reduce fuel pressure pulses exceeding a preselected value in the fuel system to dampen the fuel pressure pulses and smooth operation of the fuel delivery system. The chamber 13b" can be filled with pressurized gas or ambient air as described above. The quick connect fitting 20" shown in FIG. 4 is available from Visteon and Pilot Industries.

Figure 5:
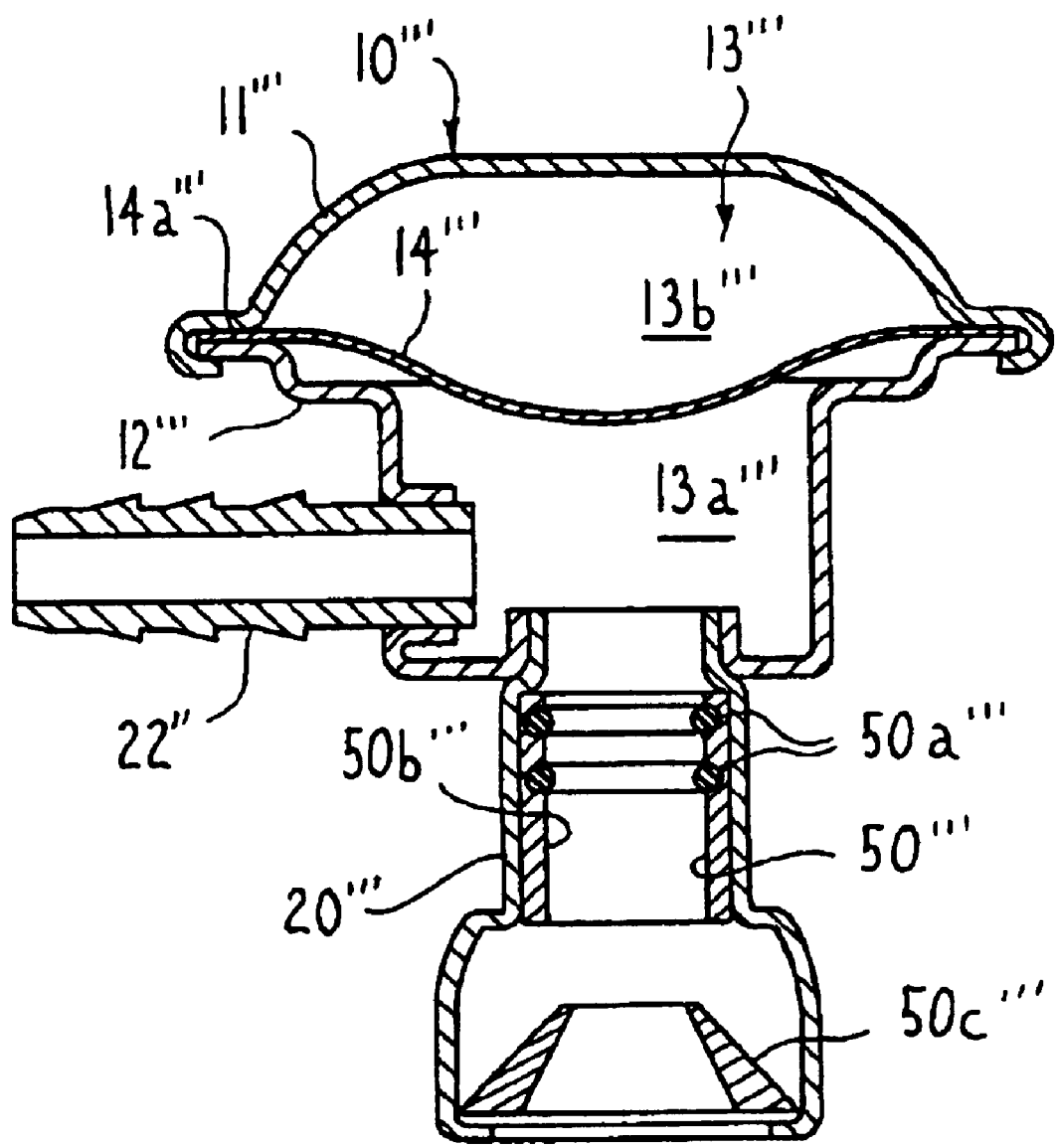
FIG. 5 is a sectional view of a fuel pressure pulse damper pursuant to still a further embodiment of the invention.

FIG. 5 illustrates another embodiment of the invention where like features are represented by like reference numerals triple primed. The fuel pressure pulse damper is shown comprising a damper body 10''' that comprises first and second metallic housings 11''', 12''' that mate together to define a chamber 13''' therein. The first and second housings 11''', 12''' are crimped directly together to trap a peripheral edge 14a' of a flexible gas-impermeable diaphragm 14'''. The diaphragm 14''' divides the chamber 13''' into a first chamber 13a''' that communicates to pressurized fuel entering the barbed fitting 22''' and leaving the quick disconnect fitting 20''' and a second air pocket chamber 13b''' that allows the diaphragm 14''' to flex in a manner to reduce fuel pressure pulses exceeding a preselected value in the fuel system to dampen the fuel pressure pulses and smooth operation of the fuel delivery system. A stuffer pin assembly 50''' is disposed in the quick connect fitting 20''' and is available from Bundy Corporation. The pulse damper 10''' alternately can include a quick connect fitting 20''' of the type shown in FIG. 4.

Figure 6:
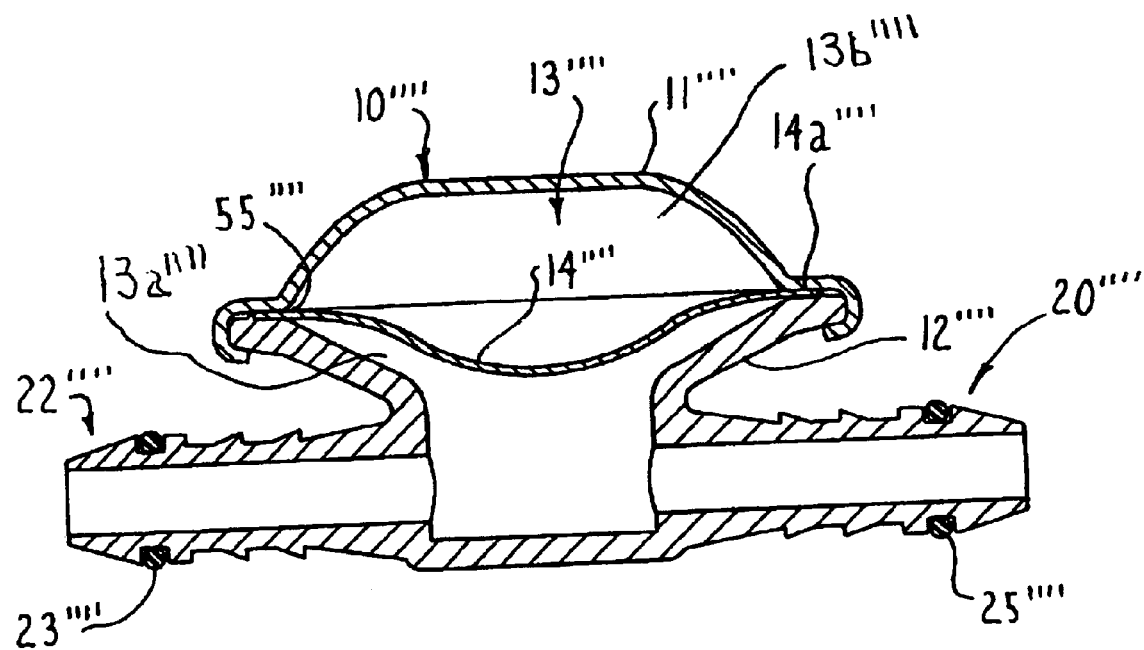
FIG. 6 a sectional view of a fuel pressure pulse damper pursuant to still a further embodiment of the invention.

FIG. 6 illustrates another embodiment of a pulse damper of the invention where like features are represented by like reference numerals quadruple primed. The fuel pressure pulse damper 10'''' is shown comprising a damper body 10'''' that comprises first and second metallic housings 11'''', 12'''' that mate together to define a chamber 13'''' therein. The first and second housings 11'''', 12'''' are crimped directly together to trap a peripheral edge 14a'''' of a flexible gas-impermeable diaphragm 14'''' and a crimp sealing gasket 55''''. The diaphragm 14'''' divides the chamber 13'''' into a first chamber 13a'''' that communicates to pressurized fuel entering the integral barbed fitting 22'''' carrying o-ring seal 23'''' and leaving the integral barbed fitting 20'''' carrying o-ring seal 25'''' and a second gas pocket chamber 13b'''' that allows the diaphragm 14'''' to flex in a manner to attentuate fuel pressure pulses exceeding a preselected value in the fuel system to dampen the fuel pressure pulses and smooth operation of the fuel delivery system. The o-rings provide a seal with respective fuel lines or hoses fitted on the fittings 23'''', 20''''. The barbed fittings 22'''', 20'''' are disposed 180 degrees apart on the damper housing 12'''' and arranged in axial alignment on opposite sides of the chamber 13a''''. Superambient (e.g. 15 to 30 psi) gas or air pressure can be trapped in chamber 13b'''' during crimping or a pre-pressurized capsule can be provided in the housing chamber 13b'''' before assembly. For example, a pre-pressurized capsule can comprise a sealed membrane bag with pressurized gas inside.

Figure 7:
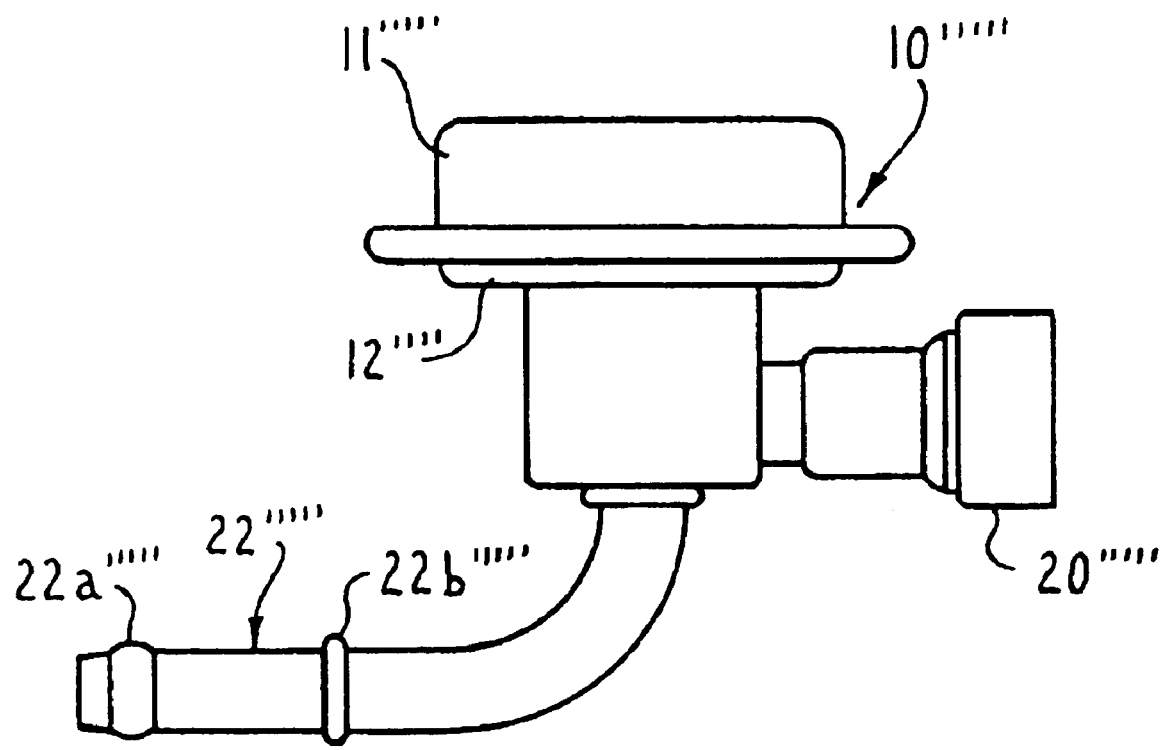
FIG. 7 an elevational view of a fuel pressure pulse damper pursuant to still a further embodiment of the invention.

FIG. 7 illustrates still another embodiment of a pulse damper of the invention where like features are represented by like reference numerals quintuple primed. The pulse damper includes a damper body 10''''' that comprises first and second metallic housings 11''''', 12''''' that mate together to define a chamber (not shown) therein but similar to the chamber 13, 13' etc. in the above embodiments. The first and second housings 11''''', 12''''' are crimped directly together to trap a peripheral edge of a flexible gas-impermeable diaphragm and a crimp, sealing gasket as described in the above embodiments. The diaphragm divides the internal chamber into a first chamber that communicates to pressurized fuel entering the integral metal (e.g. steel) pipe fitting 22'''' and leaving the integral female quick connect fitting 20'''' of the type described above and a second chamber to allow the diaphragm to flex in a manner described above to attentuate fuel pressure pulses exceeding a preselected value in the fuel system to dampen the fuel pressure pulses and smooth operation of the fuel delivery system. However, the pressurized fuel can enter the fitting 20'''' and exit the fitting 22'''' The pipe fitting 22'''' includes a fuel hose or line retention bead 22a'''' and fuel hose or line stop 22b'''' and is adapted to connect to Teflon fuel tubing which includes a stainless steel or fiberglass braiding over it and which is crimped on the fitting 22'''' with the end of the fuel hose or line abutted against stop 22b''''. The pipe fitting 22'''' and quick connect fitting 20'''' are disposed 90 degrees apart on the damper housing 12''''. Superambient gas or air pressure can be trapped in the second chamber during crimping or a pre-pressurized capsule can be provided in the housing second chamber before assembly as described above.

Although the invention has been described with respect to certain embodiments thereof, those skilled in the art will understand that the invention is not limited to these embodiments and that modifications and changes can be made thereto without departing from the spirit and scope of the invention as defined in the appended claims.

What is claimed is:

1. Fuel pressure pulse damper comprising a metallic damper body defining a chamber in which a flexible diaphragm is received in a manner to dampen fuel pressure pulses between a fuel pump and fuel injectors of a vehicle fuel system, said damper body including a first fitting for receiving pressurized fuel and a second fitting for connection to a fuel rail for supplying pressurized fuel to fuel injectors of the vehicle engine, said diaphragm forming a first chamber that communicates to pressurized fuel entering the first fitting and leaving the second fitting and a second springless sealed chamber on an opposite side of said diaphragm, said second chamber having gas at superamibient pressure sealed therein.

2. The damper of claim 1 wherein said damper body includes first and second metallic housings that mate together to define the chamber and to trap a peripheral edge of the flexible diaphragm such that the diaphragm divides the chamber into said first chamber that communicates to pressurized fuel entering the first fitting and leaving the second fitting and said second sealed chamber on said opposite side, said diaphragm flexing in a manner to attenuate fuel pressure pulses in the fuel system.

3. The damper of claim 2 wherein one of the first and second metallic housings is metallurgically fastened to a metallic quick connect fitting.

4. The damper of claim 3 wherein the quick connect fitting is formed integrally with said one of the first and second housings.

5. The damper of claim 1 wherein the first fitting is preformed as a separate metallic component and fastened metallurgically to the damper body.

6. The damper of claim 1 wherein the first fitting is formed integrally with the metallic damper body.

7. The damper of claim 1 wherein the second chamber contains air.

8. The damper of claim 1 wherein the second chamber communicates to a charge port metallurgically sealed after the second chamber is charged with said gas.

9. A method of making a fuel pressure pulse damper, comprising assembling a flexible diaphragm in a damper body in a gas pressurized enclosure having superambient gas therein such that said superambient gas is trapped in a sealed chamber between the diaphragm and the damper body.

10. The damper of claim 1 wherein the second fitting comprises a quick connect fitting fastened to the metallic damper body.

* * * * *